United States Patent [19]

Tomita

[11] Patent Number: 5,298,987
[45] Date of Patent: Mar. 29, 1994

[54] METHOD FOR INVESTIGATING GROUND STRUCTURE OF PAVEMENT

[75] Inventor: Hiroshi Tomita, Tokyo, Japan

[73] Assignee: Geo Search Co., Ltd., Tokyo, Japan

[21] Appl. No.: 768,817

[22] Filed: Sep. 30, 1991

[30] Foreign Application Priority Data

Oct. 4, 1990 [JP] Japan .................................. 2-267060

[51] Int. Cl.[5] .......................... H04N 7/18; G06K 9/00
[52] U.S. Cl. ........................................ 348/82; 73/151;
324/338; 364/422; 382/1
[58] Field of Search .............. 382/1; 358/100; 73/151,
73/152, 153; 324/323, 324, 333, 338, 368;
364/422

[56] References Cited

U.S. PATENT DOCUMENTS

| | | | |
|---|---|---|---|
| 2,849,530 | 8/1958 | Fleet | 358/100 |
| 3,974,330 | 8/1976 | Askowith et al. | 358/100 |
| 4,779,201 | 10/1988 | Iizuka et al. | 324/338 |
| 4,783,751 | 11/1988 | Ehrlich et al. | 382/1 |
| 4,852,182 | 7/1989 | Herbin et al. | 382/1 |
| 4,855,820 | 8/1989 | Barbour | 358/100 |
| 5,134,471 | 7/1992 | Gendron et al. | 358/100 |

*Primary Examiner*—Leo H. Boudreau
*Attorney, Agent, or Firm*—McAulay Fisher Nissen Goldberg & Kiel

[57] ABSTRACT

Method for investigating the ground structure of a paved road which requires only a small diameter boring for direct observation of the ground structure. The method comprises a step of boring an investigation hole with a small diameter which reaches at least a sand layer of a roadbed, penetrating a paved floor of said paved road, a step of cleaning an inside of said investigation hole which is bored by said boring step, a step of photographing in said investigation hole which has been cleaned by said cleaning step, said photographing step photographing an overall surface of an inner circumferential wall of said investigation hole by means of image pickup means, a step of sending this image to a warping microprocessor, a step of recording said photograph data in recording means, and a step of filling up said investigation hole after said photographing step is finished to repair the hole.

7 Claims, 5 Drawing Sheets

METHOD FOR INVESTIGATING GROUND STRUCTURE OF PAVEMENT

BACKGROUND OF THE INVENTION

1. Field of the Invention

The present invention relates to a method for investigating a ground structure of a paved road such as an asphalt-paved road in which the ground structure under the pavement can be visually analyzed.

2. Description of the Related Art

The ground structure of a paved road is composed of a roadbed A and a paved floor B on the roadbed A as shown in FIG. 5, and the roadbed A comprises, for example, a sand layer 2 rammed down on a miscellaneous soil layer 1 which is mixed with ballasts and crushed matters, and the paved floor B is composed of, for example, three asphalt layers 3, 4 and 5 in which the size of a mixed gravel is decreased in order from the gravel included in the bottom asphalt layer 3 which is located on the sand layer 2 to the gravel in the uppermost layer 5 which forms the road surface.

As for the road thus constructed, generally the design documents are reserved and used for such purposes as a repair work of the pavement.

However, the design documents of the pavements are not always specified so as to be permanently reserved so that sometimes they are lost, or some of the pavements are found to be changed from the original structure due to such cases as a later improvement or reconstruction work and the construction records of these later works are not always transferred to successors.

Meanwhile, even in a normal case, the design documents of the road and the present structure of the road do not always correctly agree with each other.

Therefore, when the pavement structure of a place selected as an object of repair is actually not clear, usually the pavement structure is investigated in advance, and then a design for the repair of the road is prepared according to the results of the investigation.

In the investigation of the ground structure of a pavement, at first a preparatory investigation is conducted to specify the location where repair is needed next, the ground of the place to be repaired and specified by the preparatory investigation is investigated.

In the ground investigation work, there is a trial digging method in which the investigation area is divided into such as a few meters square, for example, 1 m ×2 m area and the paved floor of the area is cut by an engine cutter and then the ground of the area is dug up by such as a power shovel to investigate. However in this trial digging method there are many problems such as that large scale machines have to be prepared, repair work is needed after the investigation, and also many times the working area occupies, for example, one traffic lane in one side of the road causing retard of traveling vehicles, and further it takes a long time to complete the work.

Therefore, a boring method which investigates the ground structure of a place to be investigated by means of boring is now in use.

In this boring method, it is so arranged that a hole which has a diameter of several tens of centimeters, for example, a large hole with a diameter of 36 cm, or a medium size hole with a diameter of 20 cm is bored vertically from the surface of the road and a gathered core is visually investigated.

In the ground investigation of the conventional boring method, a vertical structure of the ground of a road is visually investigated according to a core filled in a mold gathering attachment such as a pipe. However, many of the ground areas needing to be investigated are usually sunk to a roadbed A being affected by a leaked water from such as service water and/or drainage.

Therefore, in the core in the mold gathering attachment, the sunk portion of the ground is not gathered as it is a vacant space, while the total portion is gathered in a compacted state so that there is a problem that the gathered core do as not agree with the actual vertical ground structure.

Also, there is another problem that, even if damages such as cracks are generated in respective layers 3, 4 and 5 of the asphalt-paved floor B, those cracks are gathered in a crushed and filled state due to the pressure accompanying the gathering of the core, so that those cracks can not be detected.

Further, the hole made by boring has a diameter of a large size or a medium size and also has a depth of from approximately 1 through 2 m. Therefore a large amount of cement is needed for filling up the hole after finishing the investigation, and incidentally workings of the cement such as kneading and some workers therefor are required, thereby the labor time is increased, and as it is difficult to repair it perfectly, this has been a cause of deterioration to the pavement.

SUMMARY OF THE INVENTION

An object of the present invention is to provide a method for investigating the ground structure of a paved road by which such drawbacks mentioned above in the conventional trial digging method or boring method are solved, and in which method boring with a very small diameter satisfies the need, and moreover, an actual structure of the ground can be directly observed.

The method for investigating the ground structure of a paved road to realize the object of the present invention comprises:

a step of boring an investigation hole with a small diameter which reaches at least a sand layer of a roadbed, penetrating a paved floor of the pavement;

a step of cleaning an inside of the investigation hole which is bored by the boring step;

a step of photographing the investigation hole which has been cleaned by the cleaning step, photographing an overall surface of an inner circumferential wall of the investigation hole by means of image pickup means, a step of sending this image to a warping microprocessor, a step of recording the photograph data in recording means, and recording photograph data in recording means;

a step of filling up the investigation hole after the photographing step is finished.

DETAILED DESCRIPTION OF THE PREFERRED EMBODIMENT

Figure 1:
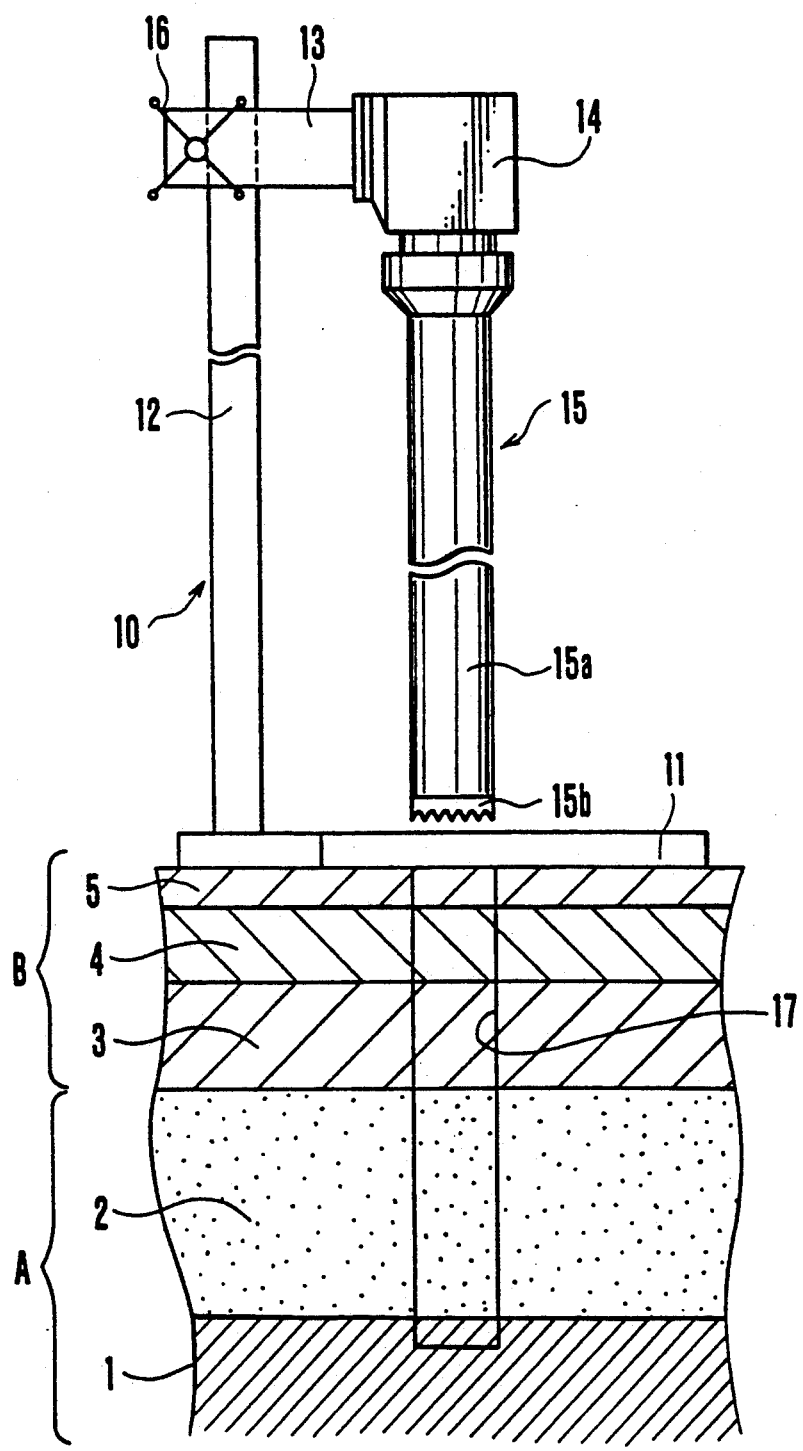
FIG. 1 is a sectional view showing one embodiment of the present invention.

Detailed description of the present invention will be made hereinbelow with reference to an embodiment shown in the drawings.

In FIG. 1, the reference numeral 10 denotes a boring stand which is fixed on the road to be investigated. In the boring stand 10, a support 12 is erected on a base plate 11 and a drill, for instance, a core drill 14 is attached to a lifting device 13 which is mounted on the support 12.

To this core drill 14, a drill 15 is removably attached for boring an investigation hole, for instance, approximately 1.2 m deep in the pavement, and then bores the pavement by manually operating a lifting handle 16 of the lifting device 13 to vertically and downwardly push down the drill 15 which is rotating at high speed. From the view point of a nondestructive investigation, a preferable diameter of an investigation hole 17 which is bored by the drill 15 is approximately from 3 to 10 cm, and in the present embodiment, the investigation hole 17 is bored with the diameter of 3 cm. However, the diameter of the investigation hole 17 can be reduced to about 1 through 2 cm for an actual use.

The drill 15 comprises a cutter 15b made of such as diamond bits attached to the top of a tubular body 15a, and is adapted so as to be able to gather the core of the ground of the pavement in the tubular body 15a. However, in the method of the present invention, the surface of the inner circumferential wall of the bored hole is directly observed. Therefore, though the core gathered is useful as an auxiliary material for the investigation of the ground, it is not directly used for the investigation of the structure of the ground.

The ground of paved road usually has an asphalt-paved floor B the depth of which is 50 through 60 cm from the surface of the road, so that while boring this paved floor B, water is pressurized into the bore from the start of the boring to prevent wear of the cutter 15b.

When boring the paved floor B is finished, the cutter 15b commences the boring of the sand layer 2, then the above-mentioned supply of a pressurized water in the boring operation of the paved floor B is stopped to keep an intact state of the surface of the inner circumferential wall of the hole to be obtained by the boring of the sand layer 2. When the drill 15 transfers from the paved floor B to the sand layer 2, it is detected, for example, by the feeling of the hand operating the lifting handle 16 of the lifting device 13, namely, it can be noticed by a fact that the pushing down force applied to the lifting handle 16 in the paved-floor B suddenly changes from strong to weak. When the lifting device 13 is automatically pushed down, the change in the pushing down force can be detected by means of such as a pressure sensor.

In addition, as is clear from the small diameter of the investigation hole 17 to be bored, the pressurized water which is supplied in the boring operation of the paved-floor B is required only in a small amount, so that when the boring transfers to the sand layer 2, a little delay in stopping the supply of pressurized water does not cause any trouble.

The investigation hole 17 to be used for investigating the ground has a depth of 1.2 m which equals to the total length of the drill 15, and usually this depth covers the sand layer 2, but according to circumstances the depth may be made approximately 2 m.

When the boring of the investigation hole 17 is finished, a small amount of water is gushed from such as a nozzle of a water pump to clean the surface of the inner circumferential wall of the investigation hole 17, and consecutively the water is suctioned by a suction pump to prevent the water from collecting in the investigation hole.

Also, it is preferable to clean the surface of the inner circumferential wall of the bored asphalt layer by means of a rotary brush, to make it possible to observe more clearly the surface of the inner circumferential wall of the bored paved-floor B. This rotary brush can be equipped in the core drill 14 in place of the drill 15, and by measuring a correct depth of the paved-floor B in the boring operation, cleaning of the paved-floor B can be performed with this rotary brush without touching the sand layer 2.

When the boring operation described above is finished, the observation of the wall surface of the investigation hole 17 which is 1.2 m deep, bored and cleaned, is conducted over the surface of the inner circumferential wall.

Figure 2:
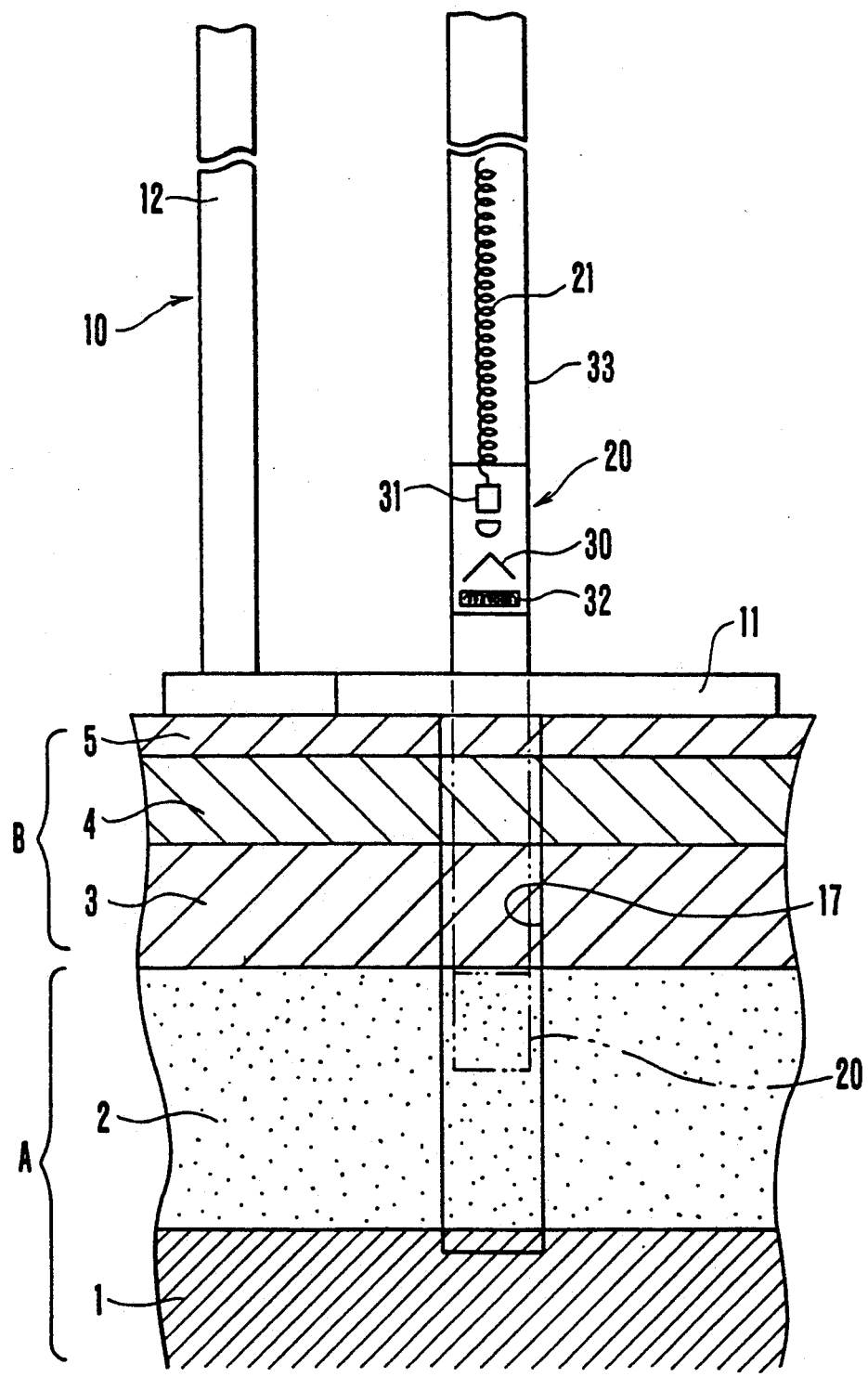
FIG. 2 is a sectional view showing an operation of the investigation.

The outline of this operation is shown in FIG. 2.

The observation of the wall surface is conducted by inserting an image pickup means 20 which comprises such as a CCD camera into the investigation hole 17, lowering the device at an almost constant speed and photographing all over (360°) the surface of the inner circumferential wall.

Images of the surface of the inner circumferential wall photographed by the image pickup means 20 are inputted into an image processing unit 22 through a connecting cable 21. On the occasion, a position data from a later-described position detector 23 of an image pickup device is inputted into the image processing unit 22 corresponding to information of the photographed images.

Figure 3:
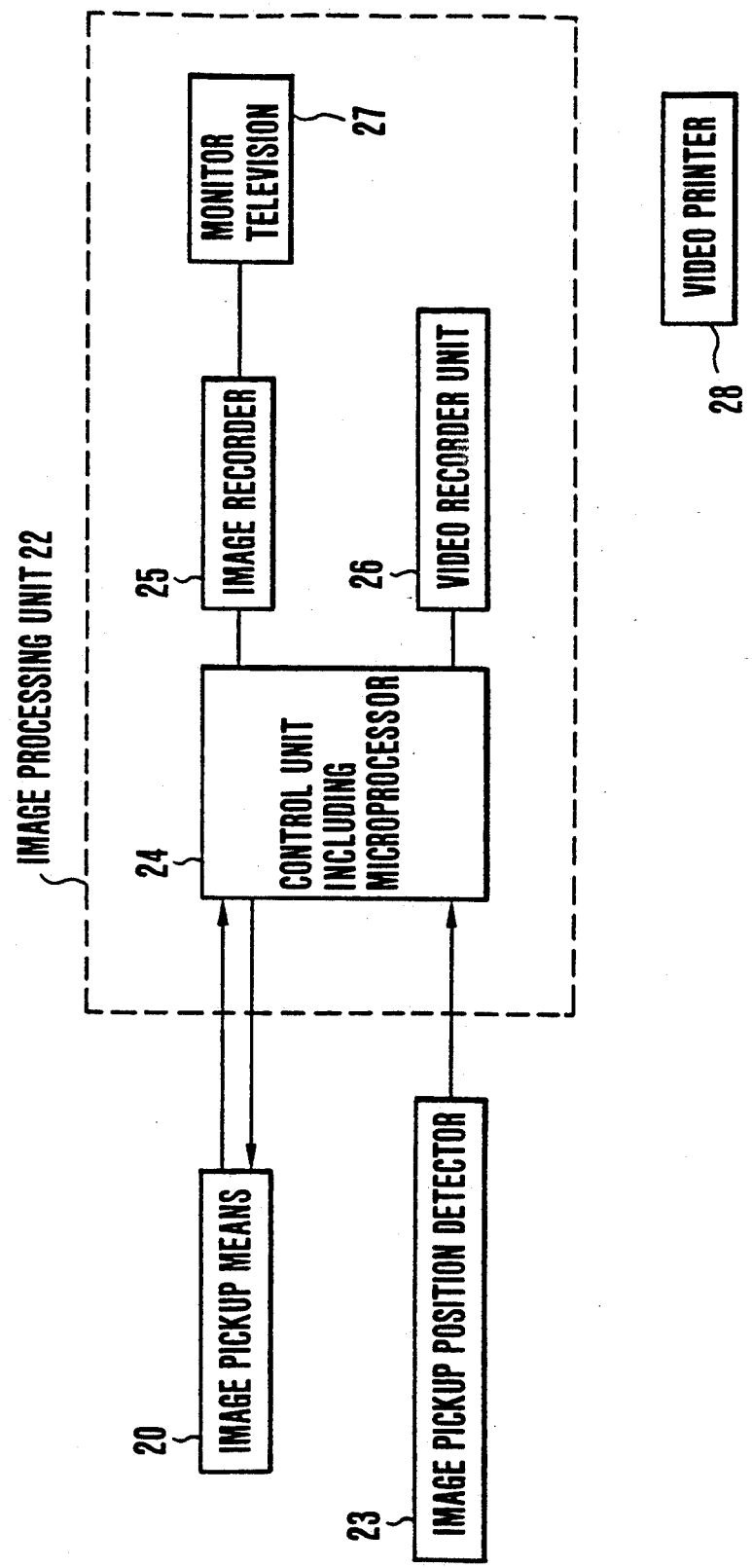
FIG. 3 is a block diagram showing the image processing unit.

As is shown in FIG. 3, the image processing unit 22 is composed of a control unit 24 which controls the total unit, a warping unit such as a microprocessor which straightens the image, an image recorder 25 made of a digital recorder which records image information from the image pickup means 20, a video recorder 26 to back up data and a monitor television 27 which monitors such as photographed images.

Moreover, record information such as image data recorded at the image recorder 25 are inputted into a video printer 28 directly or through a recording medium such as a floppy disk, and printed out as colored pictures. Furthermore, it can be arranged so that every image on the monitor television 27 is photographed by a still camera.

The images printed out here becomes the images of the developed surface of the inner circumferential wall of the investigation hole 17.

In the present embodiment, the image pickup means 20 is arranged so as to be lowered without rotating around the longitudinal center line of the investigation hole 17 to avoid a gap between the programmed and the actual starting position of photographing. Now this is described with reference to FIG. 2.

The image pickup means 20 has a conical mirror 30, above which is placed an image pickup device 31 made of CCD whose center of an optical axis of photographing is arranged in coincidence with a center line of the mirror, and by using the image pickup device 31 and by way of the mirror 30, the image pickup means 20 takes a photograph of the surface of the inner circumferential wall of the investigation hole 17 which is illuminated by a battery-powered light source 32.

As the result of the above-mentioned processes, the overall surface of the inner circumferential wall of the investigation hole 17 can be continuously photographed by means of the image pickup device 31.

The image pickup means 20 is fixed to the end of a supporting rod 33 whose diameter is a little smaller than that of the investigation hole 17, and a center axis of the supporting rod 33 and the center line of the optical axis of photographing of the image pickup device 31 are coincident with each other. In addition, when an investigation hole is approximately 1 cm in diameter, a fiberscope such as used as a camera for an examination of the interior of human stomach can be used.

In the mean time, the supporting rod 33 has to be inserted into the investigation hole 17 keeping both center axes in coincidence.

This is because any gap between two axes causes a damage of the image pickup means 20 which is given by the surface of the inner circumferential wall of the investigation hole 17 and because this damage must be avoided.

Figure 4A:
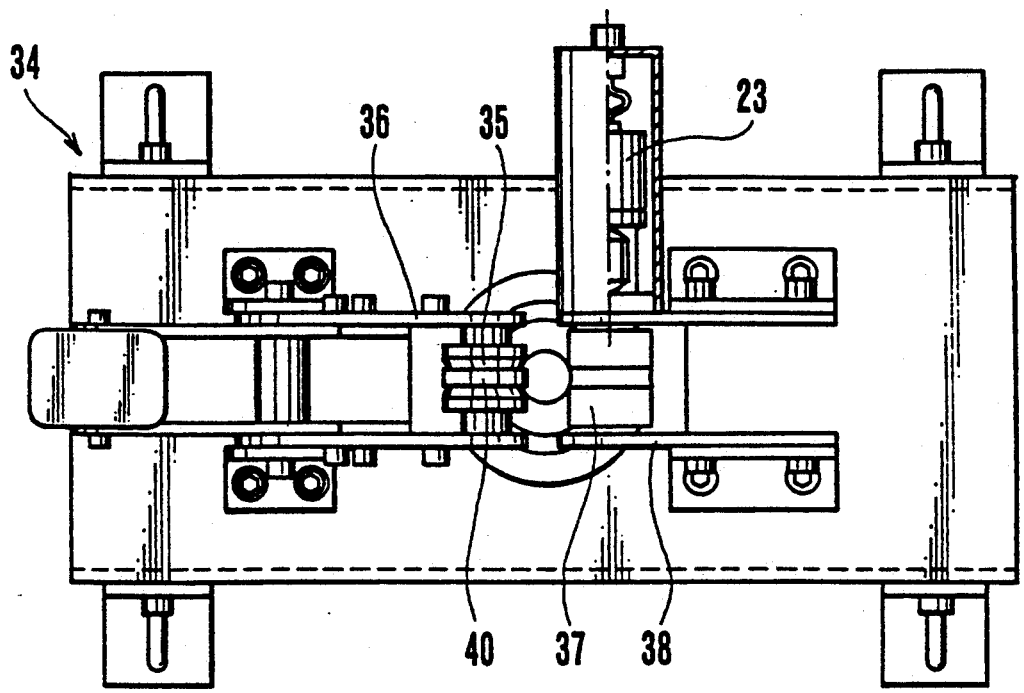
FIG. 4 (a) and (b) show respectively a plane view and a front view of the supporting frame.
Figure 4B:
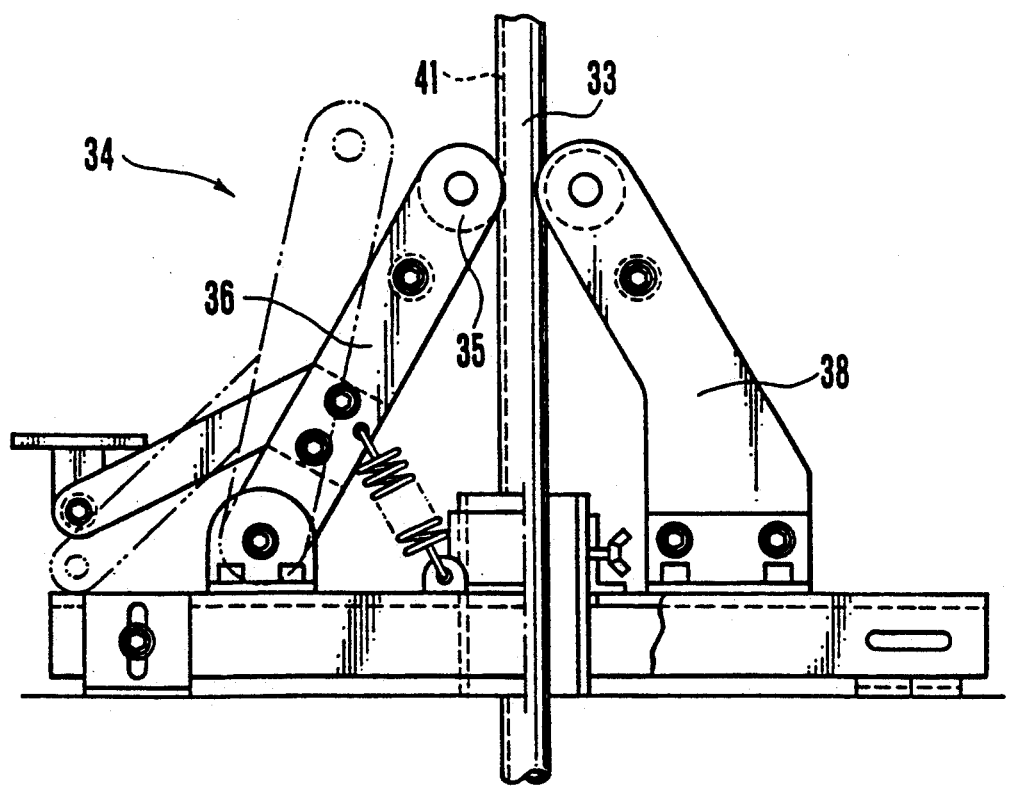
Figure 5:
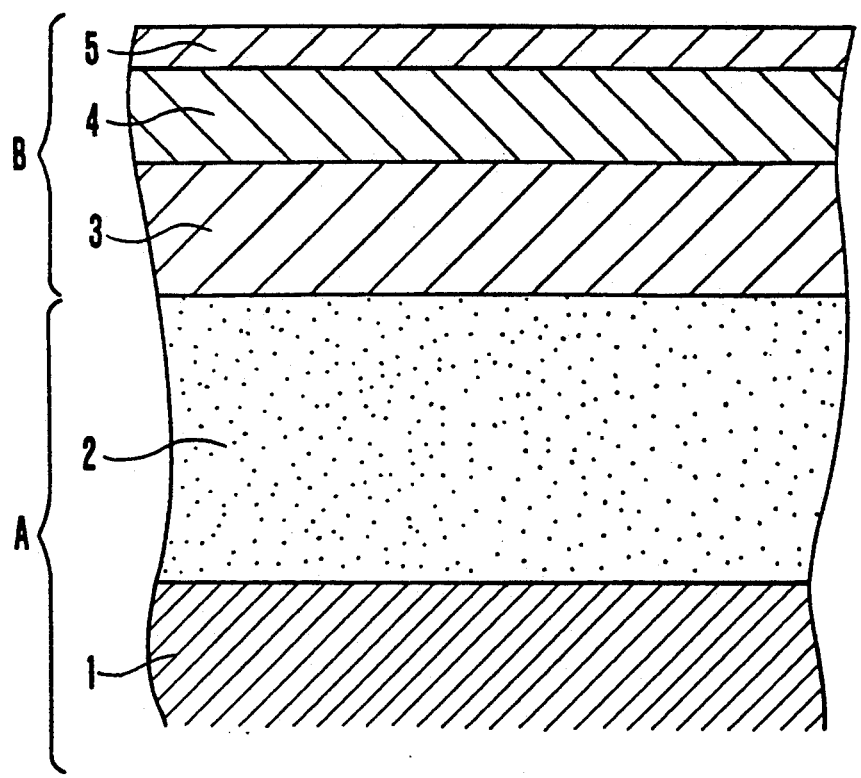
FIG. 5 is a sectional view showing a ground structure of the pavement.

Therefore, the boring stand 10 is utilized in the present embodiment. Namely, the center axis of the investigation hole 17 is coincident with the center line of the rotary axis of the core drill 14 mounted on the boring stand 10, so that the base plate 11 is left in the same position after the boring operation of the investigation hole 17 is finished, and on which a supporting frame 34 shown in FIG. 4 is fixed to vertically support and guide the supporting rod 33 at the designated position on the base plate 11.

The supporting frame 34 has a guide roller 35 attached to the top thereof, a movable arm 36 which is strengthened by a spring, and in the opposed position thereto a measurement arm 38 with a counter roller 37 attached to the top of the arm, and the supporting rod 33 is adapted so as to be inserted between these rollers 35 and 37.

The counter roller 37 is arranged so as to rotate in a friction contact with the inserted supporting rod 33 without slipping, and its rotation is detected by the position detector 23 such as a rotary encoder, and the data is inputted into the image processing unit 22 as the position (vertical position) information of the image pickup means 20.

Meanwhile, a projection 40 is formed on the circumferential surface of the guide roller 35 extending in the circumferential direction, which engages with a fitting groove 41 provided on the outer surface of the supporting rod 33 in the longitudinal direction.

That is, the supporting rod 33 is restricted to rotate around the axis when it is inserted into the hole with its fitting groove 41 which is engaged with the projection 40, and then this allows the image pickup means 20 to be inserted into the hole, for photographing the surface of the inner circumferential wall of the investigation hole 17, move vertically without rotating around the axis.

The supporting rod 33 is attached to a lifting attachment (not shown) to be mounted on the lifting device 13 in place of the core drill 14, and it functions in such a way that when it is inserted into the investigation hole 17 by an operator who manipulates the lifting handle 16, the distance of insertion simultaneously measured by a position detector 39 is recorded in a distance counter display of the image processing unit 22.

When a signal is put out for starting the photographing, the image pickup means 20 starts to photograph, and the images taken are recorded in the image recorder 25 and the data-backup video recorder 26, and at the same time those records are displayed on the monitor television 27 so that the operator can confirm that the data is being correctly gathered.

Namely, by inserting the supporting rod into the investigation hole, the surface of the inner circumferential wall of the investigation hole 17 can be photographed continuously all over the length thereof.

The image taken up by the image pickup means is a raw 360 degrees image, which is converted by a microprocessor into a two-dimentional image for observation.

When the photographing of the investigation hole 17 is finished over the length, the supporting rod 33 is extracted from the investigation hole 17 and the hole is filled up.

In this filling up operation, a rapid-strength mortar cement is first poured into the hole from the bottom up to the part close to the surface layer portion and then the surface layer portion is filled up by an asphalt compound. The investigation hole 17 is small in diameter and is at most about 2 m deep, so that a small amount of a mortar cement suffices to fill up the hole, thus enabling a very efficient repairing operation, and pavement damage is minimal during the operation.

That is, it may be said that the investigation by the investigation hole 17 which is small in diameter equals a nondestructive investigation.

In this system, the image data obtained is printed out by the video printer 28, for example, as colored pictures at every photographing, and the data is used to show the depth of the photographing positions by these pictures together with the images photographed concurrently.

By arranging the printed out picture sheets according to their positions upper and under, the developed pictures of the surface of the inner circumferential wall of the investigation hole 17 can be obtained over the length of the hole.

A series of operations mentioned above such as the boring of the investigation hole, the cleaning of the investigation hole, the photographing of the surface of the inner circumferential wall by means of the image pickup means and the filling up of the investigation hole after finishing the investigation, are conducted, for instance, at every 20 m in the length of the pavement which is selected as an object of an investigation, and by which the sectional structure of the pavement of such as several hundreds meter long can be known in the range of 1 through 2 m deep.

Moreover, a place in the pavement where an investigation of its structure is needed is found by a well known underground radar means comprising a transmitter-receiver. For example, by mounting this underground radar means on a vehicle, and transmitting radar waves toward the road traveling at the speed about 40 km per hour, then by receiving reflection waves coming back through the ground and analyzing this data received, the place of investigation is found as a phenomenon such as a border abnormality of the ground structure.

However, by this data it can only be determined that there is a border abnormality in the ground structure, and the state of the structure can not be judged precisely. Therefore, the above-mentioned investigation of the ground structure by boring investigation holes in the pavement becomes necessary.

Furthermore, the investigation hole bored in the above-mentioned embodiment is about 2 m deep. However the present invention is not limited to this depth, but an investigation is also possible with a hole about 3 through 5 m deep.

As described above, according to the present invention, it is only required to bore an investigation hole with a small diameter in the pavement, and the time for boring the hole necessary for the investigation and the repair time for filling up the hole are greatly shortened and the damages to the pavement which have been caused by the conventional repairing method can also be reduced.

Also, it is possible to directly observe the ground structure under the pavement, particularly it is possible to observe the actual state of the ground structure in the reserved condition, so that the precise information of the ground structure can be obtained and such as printing out of the state becomes also possible.

Further, by displaying the obtained image on a monitor screen of a large size, it becomes possible to observe the image in an enlarged scale, and resultantly a further close analysis of the image becomes also possible.

Furthermore, the data gathered can be changed to a digital form, and by storing them in such as an optical disk, a storage space for data which has been kept to date in a form of such as core samples can be largely reduced and a preservability of the data becomes highly improved, so that the data can be utilized more easily as a material for control.

What is claimed is:

1. A method for investigating a ground structure of a paved road, comprising the steps of:

boring an investigation hole with a small diameter which reaches at least a sand layer of a roadbed, penetrating a paved floor of said paved road;

cleaning an inside of said investigation hole which is bored by said boring step;

photographing, in said investigation hole which has been cleaned by said cleaning step, an overall surface of an inner circumferential wall of said investigation hole by an image pickup means for providing an image of said overall surface;

sending said image to a warping microprocessor for providing photograph data of said image;

recording said photograph data in recording means; and filling up said investigation hole after said photographing step is finished to repair the hole.

2. A method for investigating a ground structure of a paved road according to claim 1, in which the diameter of the investigation hole is in a range of approximately several centimeters.

3. A method for investigating a ground structure of a paved road according to claim 1 in which the depth of the investigation hole is up to 2 meters.

4. A method for investigating a ground structure of a paved road according to claim 1 in which the investigation hole is photographed vertically and successively.

5. A method for investigating a ground structure of a paved road according to claim 1 in which a photograph data of an overall surface of an inner circumferential wall of the investigation hole taken by the photographing step is shown in a developed state of display.

6. A method for investigating a ground structure of a paved road according to claim 1 in which a vertical position of the image pickup means is detected by position detection means.

7. A method for investigating a ground structure of a paved road according to claim 6, in which position information from the position detection means are recorded in accordance with said photograph data.

* * * * *